United States Patent [19]

Seong

[11] Patent Number: 5,715,350
[45] Date of Patent: Feb. 3, 1998

[54] MAGNETIC RECORDING AND REPRODUCING APPARATUS USING AN ACCELERATING SIGNAL TO REDUCE NOISE WHEN CHANGING REPRODUCING MODES

[75] Inventor: Seung-hoon Seong, Suwon, Rep. of Korea

[73] Assignee: Samsung Electronics Co., Ltd., Kyungki-do, Rep. of Korea

[21] Appl. No.: 366,912

[22] Filed: Dec. 30, 1994

[30] Foreign Application Priority Data

Dec. 31, 1993 [KR] Rep. of Korea ............ 93-32292

[51] Int. Cl.$^6$ ............ H04N 9/87; H04N 5/783
[52] U.S. Cl. ............ 386/7; 386/8; 386/14; 386/79
[58] Field of Search ............ 358/310, 312, 358/335; 360/69, 73.01, 73.04, 73.05, 73.06, 73.08, 74.1; 386/7, 8, 14, 68, 78–79, 80–81, 87; H04N 5/76, 5/92, 9/79, 9/87, 5/83

[56] References Cited

U.S. PATENT DOCUMENTS

| | | | |
|---|---|---|---|
| 4,393,422 | 7/1983 | Yokobori et al. | 360/73.08 |
| 4,510,535 | 4/1985 | Tokumitsu | 360/73.05 |
| 4,568,986 | 2/1986 | Furuhata et al. | 360/73.05 |
| 5,285,329 | 2/1994 | Takayama | 360/73.04 |
| 5,327,304 | 7/1994 | Owada et al. | 360/73.04 |
| 5,463,505 | 10/1995 | Kaniwa et al. | 360/73.04 |

Primary Examiner—Thai Tran
Attorney, Agent, or Firm—Sughrue, Mion, Zinn, Macpeak & Seas, PLLC

[57] ABSTRACT

A magnetic recording and reproducing apparatus which generates reduced noise when shifting between operations such as still or slow motion mode to normal playback mode. The apparatus has a capstan motor for driving the tape at speeds determined by the combination of an acceleration signal and a capstan servo control Signal, except during a fixed time period after a still or slow motion mode is changed to a normal playback mode, during which time the capstan motor speed is controlled only in response to the acceleration signal. A system control unit coordinates changing the capstan motor speed with the switching of heads, and supplies a rotary switching pulse.

2 Claims, 2 Drawing Sheets

FIG. 2C HEAD SWITCHING PULSE

FIG. 2D ACCELERATING PULSE

FIG. 2E CFG

FIG. 2F HEAD AMP SWITCHING PULSE

FIG. 2G ROTARY SWITCHING PULSE

FIG. 2H HEAD AMP SWITCHING PULSE

FIG. 2I ROTARY SWITCHING PULSE

MAGNETIC RECORDING AND REPRODUCING APPARATUS USING AN ACCELERATING SIGNAL TO REDUCE NOISE WHEN CHANGING REPRODUCING MODES

BACKGROUND OF THE INVENTION

The present invention relates to a magnetic recording and reproducing apparatus, and more particularly, to a magnetic recording and reproducing apparatus for reducing noise generated when changing from a still image mode to a normal reproducing mode.

Typically, magnetic recording/reproducing apparatuses, e.g., videocassette recorders, have a special reproducing function and a normal reproducing function. During normal reproduction, the speed of a capstan motor is controlled so that a tape travels at the same speed as that used for recording. Therefore, during a normal reproducing mode, a rotating head scans along a track of the tape. During a special reproducing mode, the speed of the capstan motor is controlled so that the tape travels past the rotating head at a different speed from that of normal reproducing mode, that is, at a faster speed (multiple reproducing speeds or a high speed search), at a slower speed (slow-motion reproducing) or at a stopped state (still-frame reproducing). Therefore, during a special reproducing mode, the rotating head traverses tracks of the tape. Accordingly, since the rotating head scans along the track, a clear image without noise can be viewed during the normal reproducing of a reproduced image, but, during the special reproducing mode, noise bars are generated which correspond in number to the traversals of the rotating head across tracks.

Therefore, if the reproducing mode is changed from a still mode or a slow motion mode to a normal reproducing mode, since the track is traversed by the rotating head until the speed of the capstan motor returns to the speed of the normal reproducing mode, noise bars are continuously generated. That is, there is a defect in that noise appears until the speed of the capstan motor returns to a normal speed at which it was operating before changing mode.

Therefore, the videocassette recorder utilizing a four-head double-azimuth method performs an envelope detecting process during a standard-time reproduction mode or SP-mode, but switching noise is still generated during a head changing operation. Since the envelope detecting process cannot be done during a long-time reproduction mode or LP-mode, noise is also generated. The quality of a videocassette recorder is lowered by the generation of such noise.

SUMMARY OF THE INVENTION

To solve the above problem, it is an object of the present invention to provide a magnetic recording and reproducing apparatus which reduces noise generated as an operation mode is changed from a special reproducing mode, such as a still mode or a slow motion mode, to a normal reproducing mode.

To achieve the above object, there is provided a magnetic recording and reproducing apparatus according to the present invention comprising:

a capstan motor for traveling a tape;

a signal generator for generating a capstan frequency signal to detect a rotating speed of the capstan motor;

a capstan servo circuit means for receiving the capstan frequency signal and generating a capstan servo control signal and a head switching signal;

a system control circuit means for generating a predetermined accelerating control signal, a head amplifier switching signal and a rotary switching signal according to a preset standard-time reproducing or long-time reproducing mode, in synchronization with the input of the head switching signal when an instruction signal of a normal reproducing mode is input during a still mode or a slow motion mode;

a capstan motor driving circuit means for driving the capstan motor in response to the signal obtained by combining the accelerating control signal with the capstan servo control signal;

a pre-amplifier means for amplifying a signal reproduced by a selected head through a selected head amplifier and then outputting the amplified signal, in response to the head switching signal and the head amplifier switching signal; and a chrominance signal processing circuit means for processing a chrominance signal in response to the rotary switching signal.

BRIEF DESCRIPTION OF THE DRAWINGS

The above objects and advantages of the present invention will become more apparent by describing in detail a preferred embodiment thereof with reference to the attached drawings in which:

FIGS. 2A through 2I are waveform diagrams for explaining the operation of each portion in FIG. 1.

DETAILED DESCRIPTION OF THE INVENTION

Figure 1:
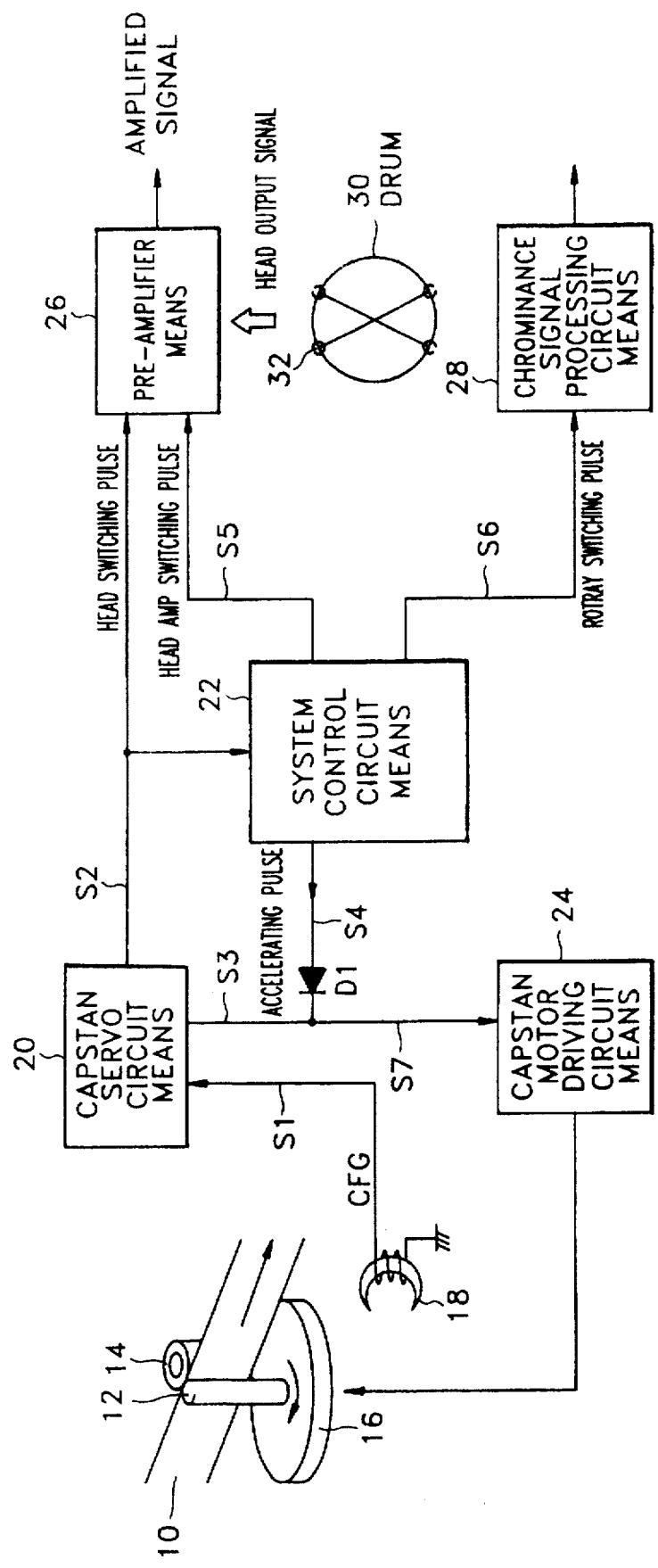
FIG. 1 is a block diagram of a magnetic recording and reproducing apparatus according to the present invention.

The apparatus shown in FIG. 1 has a capstan motor 16 for causing a magnetic tape 10 placed between a pinch roller 14 and a capstan spindle 12 to travel by rotating capstan spindle 12, a CFG signal generator 18 which is adjacent to capstan motor 16 for generating a capstan frequency signal S1 to detect a rotating speed of the capstan motor, a capstan servo circuit 20 for receiving capstan frequency signal S1 and generating a capstan servo control signal S3 and a head switching signal S2, a system control circuit 22 for generating a predetermined accelerating control signal S4, a head amplifier switching signal S5 and a rotary switching signal S6 according to a preset standard-time reproducing mode or long-time reproducing mode, in synchronization with the input of head switching signal S2 when an instruction signal of a normal reproducing mode is input during a still mode or a slow motion mode, a capstan motor driving circuit 24 for driving the capstan motor in response to a signal S7 obtained by combining accelerating pulse S4 with capstan servo control signal S3, a pre-amplifier circuit 26 for amplifying a signal reproduced by a selected head through a selected head amplifier and then outputting the amplified signal, in response to head switching signal S2 and head amplifier switching signal S5, and a chrominance signal processing circuit 28 for processing a chrominance signal in response to rotary switching signal S6. Reference numerals 30 and 32 denote a rotary drum and a head, respectively.

Referring to FIG. 2, the operation and effect of the present invention will be described below.

Figure 2A:
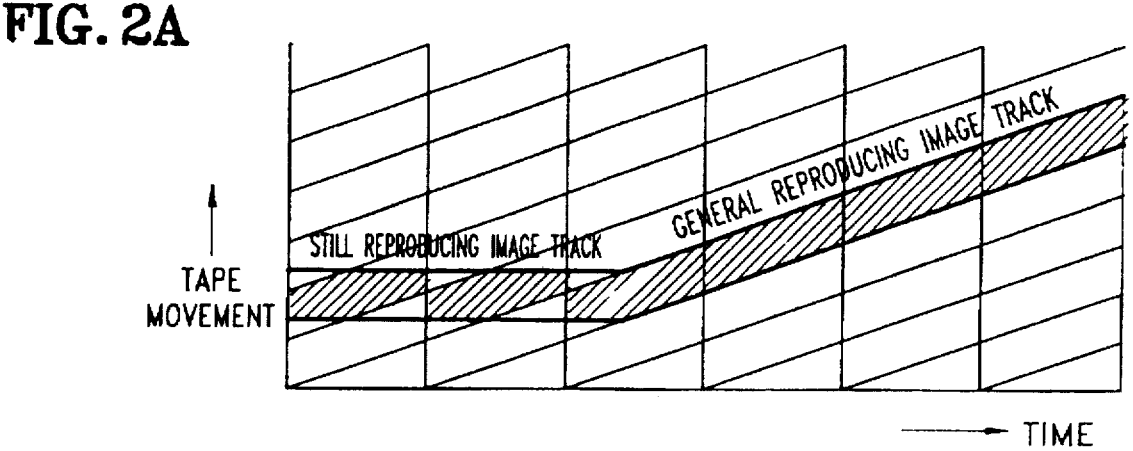

The head trace drawing shown in FIG. 2A illustrates a trace that head 32 passes on tracks of the tape. During the still mode when the tape is stopped, the head scans in a direction normal to the longitudinal direction of the tape.

Figure 2B:
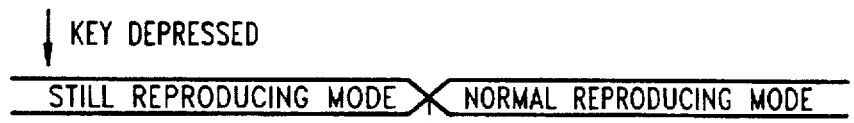
Figure 2B:
Figure 2B:
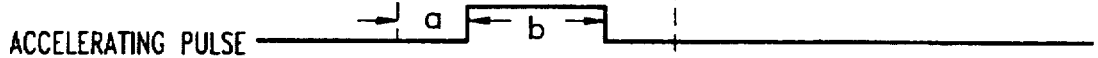
Figure 2B:
Figure 2B:
Figure 2B:
Figure 2B:
Figure 2B:

During the normal reproducing mode, the head scans along the track since the tape travels at a predetermined speed. As shown in the waveform of FIG. 2B, if a playback mode key input is applied to system control circuit 22 during the still mode, that is, if the normal reproducing mode is designated, accelerating control signal S4 is generated for a predetermined time "b" after a predetermined time "a" (FIG. 2D) has passed from the falling edge of head switching signal S2 shown in the waveform of FIG. 2C. Accelerating control signal S4 is combined with capstan servo control signal S3 output from capstan servo circuit 20 through a reverse current preventing diode D1, so as to be applied to capstan motor driving circuit 24. Before accelerating control signal S4 is applied to capstan motor driving circuit 24, that is, when the tape is in the stop state, capstan frequency signal S1 is not generated. Accordingly, since capstan servo control signal S3 is not generated, capstan motor 16 is controlled by only accelerating control signal S4. Capstan motor driving circuit 24 accelerates capstan motor 16 in the stop state for the predetermined time "b" in response to accelerating control signal S4 so that the tape can travel at the speed of the normal reproducing mode from the stop state as quickly as possible. Capstan frequency signal S1 of CFG signal generator 18 is normally generated from an end point of an accelerating control section "b". In this case, capstan servo portion 20 receives capstan frequency signal S1 and then servo-controls the tape travel at the normal reproducing mode. Therefore, as shown in FIG. 2A, the head scans along the track for a shorter period after changing modes, thereby reducing the noise generated by traversing tracks. Also, system control circuit 22 determines whether a given reproducing mode is the standard-time mode or the long-time mode, and then generates head amplifier switching signal S5 and rotary switching signal S6 corresponding to the given mode (FIGS. 2F–2I). That is, during the standard-time mode, when a playback key is input, rotary switching signal S6, having the same phase as that of head switching signal S2, is generated in synchronization with the falling edge of second head switching signal S2 as shown in FIG. 2G. During the long-time mode, rotary switching signal S6 having the opposite phase of that of head switching signal S2 is generated in the same way as shown in FIG. 2I. On the other hand, head amplifier switching signal S5 is generated having the opposite phase of that of head switching signal S2 during the standard-time mode of the still mode as shown in FIG. 2F, and having the same phase as that of head switching signal S2 during the long-time mode thereof. However, during the normal reproducing mode, head amplifier switching signal S5 is not generated, irrespective of the modes.

As described above, when the mode is changed from the still mode to the normal reproducing mode, that is, when a mode changing instruction is input, a magnetic recording and reproducing apparatus according to the present invention accelerates the capstan motor in synchronization with the head switching signal and generates a switching signal according to a mode changing of each circuit, in synchronization with the head switching signal, thereby reducing the noise caused by noise bars and generated in the switching change.

What is claimed is:

1. A magnetic recording and reproducing apparatus comprising:

a capstan motor for imparting motion to a tape;

a signal generator for generating a capstan frequency signal to detect a rotating speed of said capstan motor;

a capstan servo circuit means for receiving said capstan frequency signal and generating a capstan servo control signal and a head switching signal;

a system control circuit means for generating a predetermined accelerating control signal, a head amplifier switching signal and a rotary switching signal according to a preset standard reproducing mode or long-time reproducing mode, in synchronization with the input of said head switching signal when an instruction signal of a normal reproducing mode is input during a still mode or a slow motion mode;

a capstan motor driving circuit means for driving said capstan motor in response to a signal obtained by combining said accelerating control signal with said capstan servo control signal;

a pre-amplifier means for amplifying a signal reproduced by a selected head through a selected head amplifier and then outputting said amplified signal, in response to said head switching signal and said head amplifier switching signal; and a chrominance signal processing circuit means for processing a chrominance signal in response to said rotary switching signal.

2. A magnetic recording and reproducing apparatus comprising:

a capstan motor for imparting motion to a tape;

means for generating a capstan frequency signal;

means for generating a capstan servo control signal in response to said capstan frequency signal;

means for generating an accelerating signal in response to designation of a playback mode;

means for driving said capstan motor in response to a signal obtained by summing said capstan servo control signal and said accelerating signal, wherein said accelerating signal is generated for a predetermined period of time after the playback mode has been designated when the recording and reproducing apparatus is in one of a still and a slow playback mode.

* * * * *